United States Patent
Ho et al.

(10) Patent No.: US 10,433,263 B1
(45) Date of Patent: Oct. 1, 2019

(54) WIRELESS TRANSMISSION SYSTEM CAPABLE OF AUTOMATICALLY ADJUSTING TRANSMISSION POWER

(71) Applicant: Mars Semiconductor Corp., Hsinchu (TW)

(72) Inventors: Tsung-Ming Ho, Hsinchu (TW); Yi-Shing Chang, Hsinchu (TW)

(73) Assignee: Mars Semiconductor Corp, Hsinchu (TW)

( * ) Notice: Subject to any disclaimer, the term of this patent is extended or adjusted under 35 U.S.C. 154(b) by 0 days.

(21) Appl. No.: 15/942,615

(22) Filed: Apr. 2, 2018

(51) Int. Cl.
*H04W 52/26* (2009.01)

(52) U.S. Cl.
CPC ................................. *H04W 52/267* (2013.01)

(58) Field of Classification Search
CPC ............................ H04B 7/0817; H04L 1/0002
See application file for complete search history.

(56) References Cited

U.S. PATENT DOCUMENTS

| | | | | |
|---|---|---|---|---|
| 5,864,578 A | * | 1/1999 | Yuen | H04B 1/707 370/331 |
| 2006/0128370 A1 | * | 6/2006 | Tahara | G01C 21/26 455/420 |
| 2007/0105505 A1 | * | 5/2007 | Crocker | H04B 1/18 455/78 |
| 2010/0248646 A1 | * | 9/2010 | Yamazaki | H04W 52/0277 455/73 |

* cited by examiner

*Primary Examiner* — Hsinchun Liao

(57) ABSTRACT

A wireless transmission system capable of automatically adjusting transmission power includes a main wireless apparatus and plural secondary wireless apparatuses, and the main wireless apparatus is capable of detecting the data rate between the secondary wireless apparatuses, and increasing or decreasing the transmission power of any one of the secondary wireless apparatuses by a master controller, or increasing or decreasing the transmission power of the main wireless apparatus, so that the data rate and/or transmitting distance between the main wireless apparatus and the secondary wireless apparatuses can be optimized.

12 Claims, 4 Drawing Sheets

WIRELESS TRANSMISSION SYSTEM CAPABLE OF AUTOMATICALLY ADJUSTING TRANSMISSION POWER

FIELD OF INVENTION

The present invention relates to wireless transmission systems, and more particularly to a wireless transmission system that detects the data rate between a main wireless apparatus and a plurality of secondary wireless apparatuses by a data rate analyzer and automatically increases or decreases the transmission power by a master controller, so as to optimize the data rate and/or transmitting distance.

BACKGROUND OF INVENTION

1. Description of the Related Art

In the wireless transmission technology, the data rate may be influenced by various external environmental factors when a transmitting end transmits data to a corresponding receiving end. If the transmitting end transmits data by the same power, the most significant external environmental factor is the distance between the receiving end and the transmitting end. The greater the distance between the receiving end and the transmitting end, the weaker the intensity of signal received by the receiving end, and the slower the data rate.

Secondary, when several transmitting ends at different distances simultaneously transmit data to a receiving end with two or more wireless modules, manufacturers generally assume the wireless modules of all transmitting ends have the same transmission power, since the manufacturers are unable to predict the distance between each of the transmitting ends and the receiving end. Similarly, if a transmitting end with a plurality of wireless modules simultaneously transmits data to a plurality of receiving ends, the manufacturers may just assume the plurality of wireless modules of the transmitting end have an equally distributed transmission power. For example, a transmitting end with two wireless modules for transmitting data is default to be transmitting data to two corresponding receiving ends by 50% of the transmission power each.

Therefore, regardless of transmitting data from the transmitting ends at different distances to a receiving end, or transmitting a plurality of data from a transmitting end to the receiving ends at different distances, a certain transmitting end may have a smaller distance from the receiving end and the data rate is higher, and the other transmitting end may have a greater distance from the receiving end and the data rate is lower.

For example, when a monitoring system includes a plurality of wireless monitors (transmitting ends) for transmitting the monitoring data to a host system (receiving end), one of the monitors near the host system has a data rate much higher than the highest standard, but the monitoring data transmitted from another monitor far away from the host system cannot be received by the host system because the distance is too far. In another example, a wireless monitor (transmitting end) has to transmit the monitoring data to a plurality of display apparatuses or host systems (receiving ends) at different distances simultaneously, and the nearer display apparatus may have a data receiving rate higher than the highest standard and is capable of displaying images, but the farther display apparatus or host system is unable to receive the data. This situation may give rise to a loophole of the security to the monitoring system.

In related prior arts, CN102573036B and U.S. Pat. No. 9,107,170 have disclosed the concept of detecting a signal reception quality to adjust the output power, and the specific method and objective are to detect a reception quality (such as a signal-to-noise ratio and/or a signal intensity) of a first communication system (such as WiMAX) of an electronic device. If the reception quality is higher than the standard, the output power of the second communication system (such as Wi-Fi) will be increased to expand the transmitting distance and service range of a second communication system.

As disclosed in CN102573036B and U.S. Pat. No. 9,107,170, the first communication system of the electronic device can just receive signals passively, and the second communication system can transmit signals with an adjustable power, and such application is basically suitable for improving the service range of the second communication system when a terminal device such as a mobile phone, a tablet PC, etc is used as a base station (in network sharing), but this method cannot improve the signal reception quality of the first communication system or overcome the problem occurred when the transmitting ends at different distances transmit data to a receiving end, or when a transmitting end transmits a plurality of data to several receiving ends at different distances.

In present existing wireless transmission technologies, when the transmitting end transmits data to the receiving end, the receiving end can obtain the data rate easily and the transmitting end can detect the data rate of the receiving end by present transmission protocols. Therefore, the inventor of the present invention conceived that if both of the transmitting end or the receiving end can detect the data rate in order to increase the transmitting power of a far transmitting end and decrease the transmission power of a near transmitting end, then a receiving end situated at a position beyond the data receiving range will still be able to receive data. This invention not just increases the maximum data transmission distance between the receiving end and the transmitting end only, but also optimizes the data rate between all receiving ends or transmitting ends.

On the other hand, if all or a part of the receiving ends and transmitting ends in the system have a data rate higher than the standard, then the transmission power of the transmitting end will be decreased to achieve the power saving effect, and it is an effective way to extend the power endurance of a transmitting end that uses battery as the power source (such as a wireless monitor)

2. Summary of the Invention

Therefore, it is a primary objective of the present invention to overcome the drawbacks of the prior art by providing a wireless transmission system capable of automatically adjusting transmission power and overcoming the technical problems occurred when the transmitting ends at different distances transmit data to a receiving end, or a transmitting end transmits a plurality of data to several receiving ends, wherein the transmission power of the transmitting end is adjusted automatically. This invention not just increases the maximum data transmission distance between the receiving end and the transmitting end only, but also optimizes the data rate between all receiving ends or transmitting ends and has the effect of saving power.

To achieve the aforementioned and other objectives, the present invention discloses a wireless transmission system capable of automatically adjusting transmission power, comprising: a main wireless apparatus and a plurality of secondary wireless apparatuses, wherein the main wireless apparatus has a plurality of first wireless modules for receiving data, and each secondary wireless apparatus has a second wireless module for transmitting data to be received by the corresponding first wireless module, characterized in that the main wireless apparatus further comprises a data rate analyzer and a master controller, wherein the data rate analyzer is provided for detecting a data rate between the first wireless module and the second wireless module of each group, and the master controller may send an instruction to any one of the secondary wireless apparatuses according to the data rate of each group; and each secondary wireless apparatus comprises a slave controller capable of receiving the instruction of the master controller of the main wireless apparatus and increasing or decreasing the transmission power of the second wireless module according to the instruction, so as to optimize the data rate and/or transmitting distance between the main wireless apparatus and the plurality of secondary wireless apparatuses.

Wherein, the data rate analyzer sets a standard value of the data rate, and if the data rate between the first wireless module and the second wireless module of any group is greater than the standard value, the master controller will drive the slave controller to decrease the transmission power of the second wireless module of the group until the data rate between the first wireless module and the second wireless module of the group is equal to the standard value.

Wherein, the data rate analyzer sets a standard value of the data rate, and if the data rate between the first wireless module and the second wireless module of any group is smaller than the standard value of the data rate, the master controller will drive the slave controller to increase the transmission power of the second wireless module of the group until the data rate between the first wireless module and the second wireless module of the group is equal to the standard value.

Wherein, the data rate analyzer is capable of comparing the data rate between the first wireless module and the second wireless module of each group; the master controller decreases the transmission power of the second wireless module of the slave controller of a group having a higher data rate and increases the transmission power of the second wireless module of the slave controller of the group having a lower data rate until the data rate between the first wireless module and the second wireless module of each group is substantially equal.

Wherein, the data rate analyzer sets a standard value of the data rate and compares the data rate between the first wireless module and the second wireless module of each group; and the master controller drives the slave controller to decrease the transmission of the second wireless module in the group with a higher data rate and to increase the transmission power of the second wireless module in the group with a lower data rate, until the data rate of the first wireless module and the second wireless module is equal to the standard value.

Wherein, the main wireless apparatus is built in a monitoring host system, and each secondary wireless apparatus is built in a monitor, and the data transmitted by each second wireless module are video data.

Wherein, the main wireless apparatus comprises a memory module and a reset key, and the memory module is provided for storing an adjusting value of which the master controller drives the slave controller of each group to increase or decrease the transmission power, and the reset key is provided for driving the data rate analyzer to re-detect the data rate between the first wireless module and the second wireless module of each group.

The present invention also provides a wireless transmission system capable of automatically adjusting transmission power, comprising: a main wireless apparatus and a plurality of secondary wireless apparatuses, wherein the main wireless apparatus has a plurality of first wireless modules for transmitting data, and each secondary wireless apparatus has a second wireless module for receiving the data transmitted from the corresponding first wireless module, characterized in that the main wireless apparatus further comprises a data rate analyzer and a master controller, wherein the data rate analyzer is provided for detecting the data rate between the first wireless module and the second wireless module of each group, and the master controller is provided for increasing or decreasing the transmission power of any first wireless module according to the data rate of each group, so as to optimize the data rate and/or transmitting distance between the main wireless apparatus and the plurality of secondary wireless apparatuses.

Wherein, the data rate analyzer sets a standard value of the data rate, and if the data rate between the first wireless module and the second wireless module of any group is greater than the standard value, the master controller will drive the first wireless module of the group to decrease the transmission power until the data rate between the first wireless module and the second wireless module is equal to the standard value.

Wherein, the data rate analyzer sets a standard value of the data rate, and if the data rate between the first wireless module and the second wireless module of any group is smaller than the standard value, the master controller will drive first wireless module of the group to increase the transmission power until the data rate between the first wireless module and the second wireless module is equal to the standard value.

Wherein, the data rate analyzer is provided for comparing the data rate between the first wireless module and the second wireless module of each group, and the master controller drives the first wireless module of a group having a higher data rate to decrease the transmission power, and drives the first wireless module of a group having a lower data rate to increase the transmission power until the data rate between the first wireless modules is substantially equal.

Wherein, the data rate analyzer sets a standard value of the data rate, and compares the data rate between the first wireless module and the second wireless module of each group, and the master controller drives the first wireless module of the group having a higher data rate to decrease the transmission power, and drives the first wireless module of the group having a lower data rate to increase the transmission power until the data rate between the first wireless module is equal to the standard value.

Wherein, the main wireless apparatus is built in a monitoring apparatus, and each secondary wireless apparatus is built in a display apparatus or a monitoring host system, and the data transmitted by each first wireless module are video data.

Wherein, the main wireless apparatus includes a memory module and a reset key, and the memory module is provided for storing the transmission power of each first wireless module when the master controller stops increasing or decreasing the transmission power, and the reset key is provided for driving the data rate analyzer to re-detect the data rate between the first wireless module and the second wireless module of each group.

Compared with the prior art, the present invention detects the data rate between the main wireless apparatus and each secondary wireless apparatus and drives the slave of each secondary wireless apparatus by the master controller to increase or decrease the transmission power, or to increase or decrease the transmission power of the main wireless apparatus directly, so as to automatically adjust and optimize the data rate and/or transmitting distance between the main wireless apparatus and the plurality of secondary wireless apparatuses and effectively overcome the problems occurred when data are transmitted between the main wireless apparatus and the plurality of secondary wireless apparatuses. In addition, the adjustment to a lower transmission power can achieve the effects of saving power and extending the power endurance.

The above and other objects, features and advantages of this invention will become apparent from the following detailed description taken with the accompanying drawings.

DESCRIPTION OF THE PREFERRED EMBODIMENTS

Figure 1:
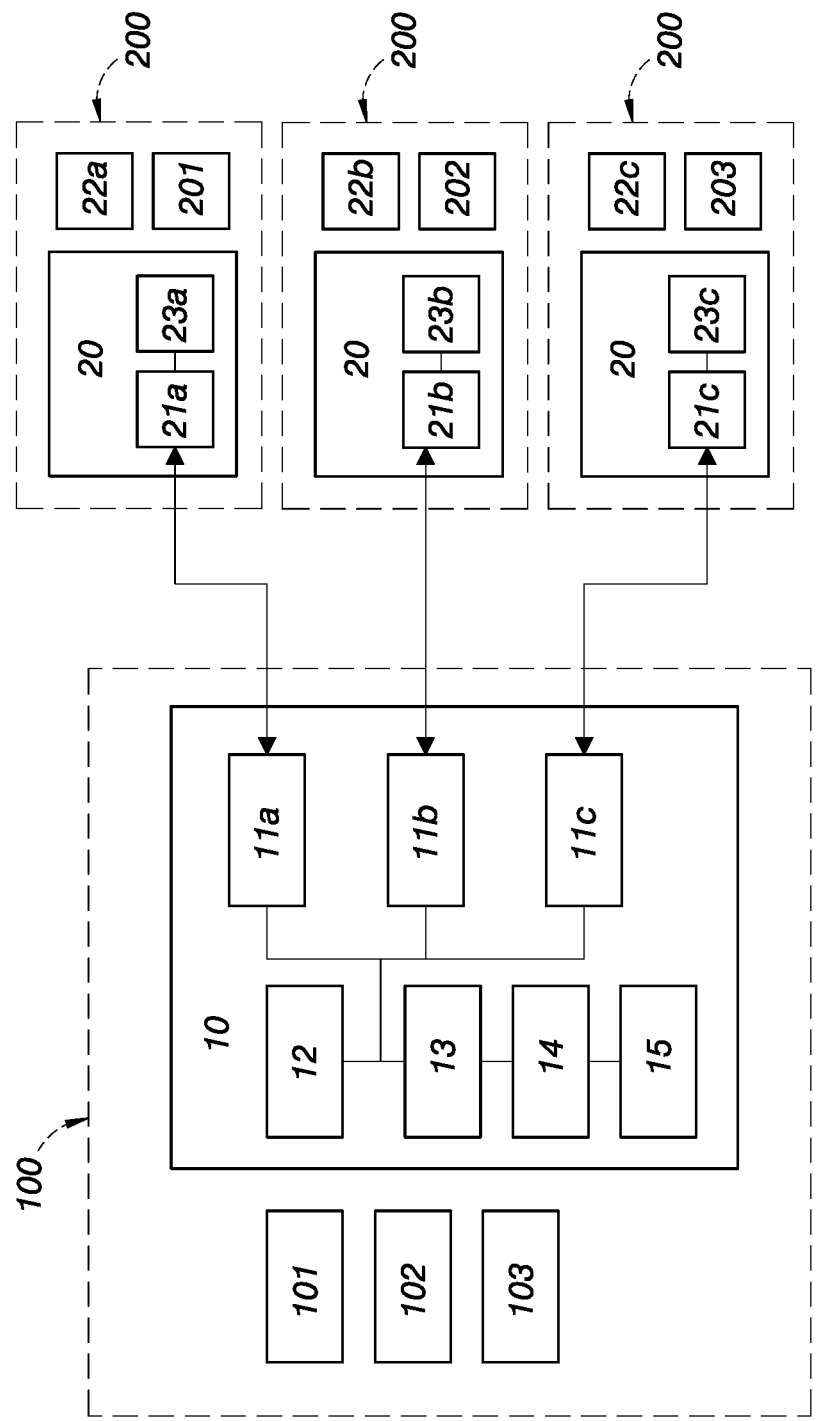
FIG. 1 is a schematic block diagram of a first embodiment of the present invention.
Figure 2:
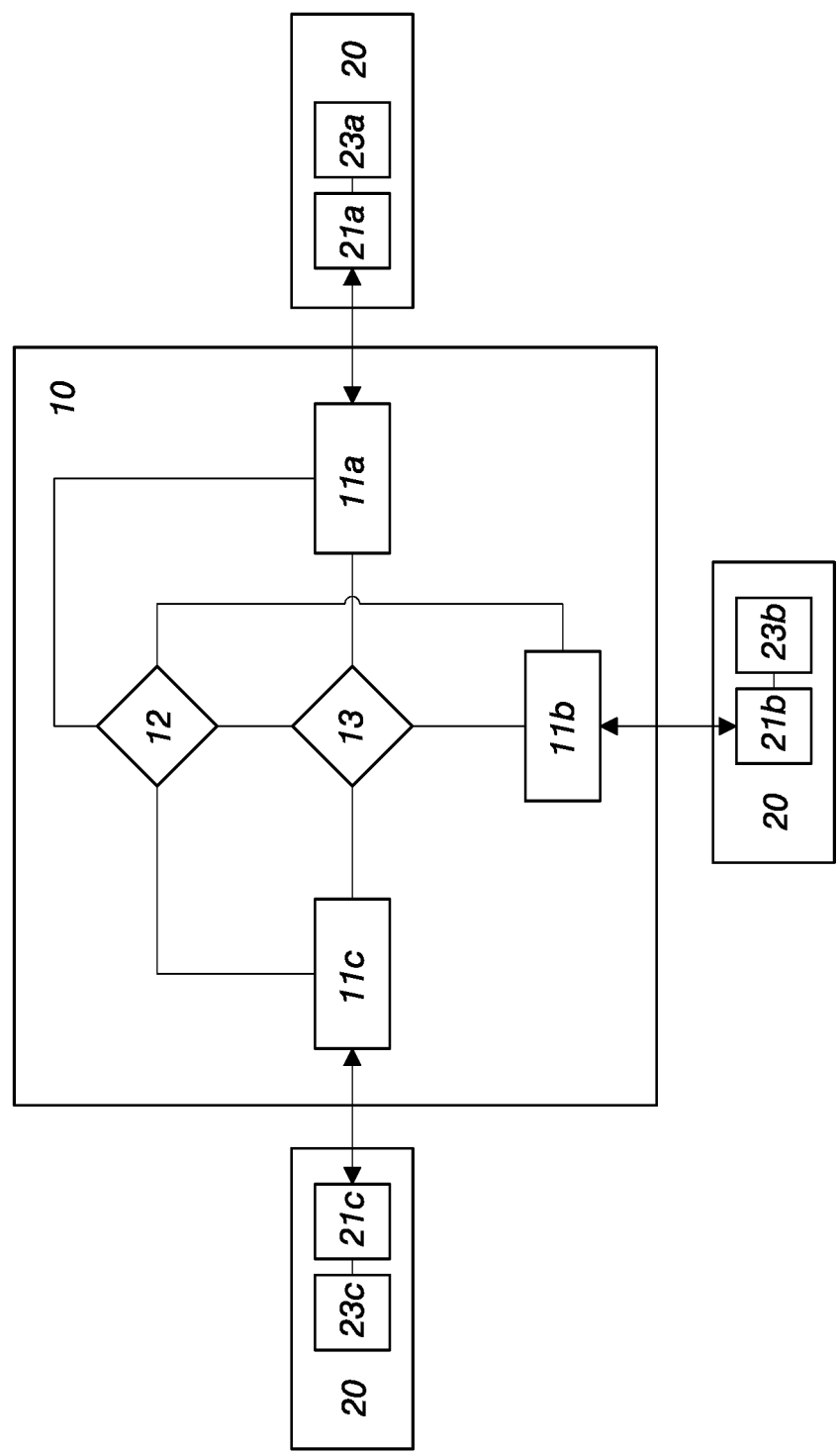
FIG. 2 is a schematic view showing the flowchart of an operation of the first embodiment of the present invention.

With reference to FIGS. 1 and 2 for a wireless transmission system capable of automatically adjusting the transmission power in accordance with the present invention, the system comprises a main wireless apparatus 10, and a plurality of secondary wireless apparatuses 20, wherein the main wireless apparatus 10 has a plurality of first wireless modules 11a, 11b, 11c for receiving data, and each secondary wireless apparatus 20 has a second wireless module 21a, 21b, 21c for transmitting data to be received by the corresponding first wireless module 11a, 11b, 11c of the main wireless apparatus 10.

The aforementioned application of the main wireless apparatus 10 for receiving data transmitted from the plurality of secondary wireless apparatuses 20 is especially applicable to a monitoring system. For example, the main wireless apparatus 10 is built in a monitoring host system 100, and a plurality of secondary wireless apparatuses 20 are built in different monitors 200 at different distances, and each monitor 200 has a battery 22a, 22b, 22c and is capable of carrying out a remote monitoring task. In the monitoring task, each secondary wireless apparatus 20 transmits video data which are to be received by the main wireless apparatus 10 built in the monitoring host system.

The main wireless apparatus 10 further comprises a data rate analyzer 12, and a master controller 13, and the data rate analyzer 12 is provided for detecting the data rate between the first wireless module 11a, 11b, 11c and the second wireless module 21a, 21b, 21c of each group, and the master controller 13 is provided for sending an instruction to any one of the secondary wireless apparatuses 20 according to the data rate of each group detected by the data rate analyzer 12.

Each secondary wireless apparatus 20 includes a slave controller 23a, 23b, 23c, for receiving the instruction sent by the master controller 13 of the main wireless apparatus 10 and increasing or decreasing the transmission power of the second wireless module 21a, 21b, 21c according to the instruction, so as to optimize the data rate and/or transmitting distance between the main wireless apparatus 10 and the plurality of secondary wireless apparatuses 20.

Different implementations of the master controller 13 driving any one of the slave controllers 23a, 23b, 23c of the secondary wireless apparatus 20 to increase or decrease the transmission power of the second wireless module 21a, 21b, 21c are described below, and it is noteworthy that the invention is not just limited to these implementations only.

Implementation 1: The data rate analyzer 12 sets a standard value of the data rate. If the data rate between the first wireless module 11a and the second wireless module 21a of any group is greater than the standard value, then the master controller 13 will drive a slave controller 23 of the second wireless module 21a of the group to decrease the transmission power until the data rate between the first wireless module 11a and the second wireless module 21a of the group is equal to the standard value. Therefore, the battery 22a of the secondary wireless apparatus 20 with the second wireless module 21a consumes less power to achieve the power saving effect.

Implementation 2: The data rate analyzer 12 sets a standard value of the data rate. If the data rate between the first wireless module 11b and the second wireless module 21b of any group is smaller than the standard value, the master controller 13 will drive the slave controller 23b of the second wireless module 21b of the group to increase the transmission power until the data rate between the first wireless module 11b and the second wireless module 21b of the group is equal to the standard value. Therefore, the data rate and/or transmitting distance of the secondary wireless apparatus 20 with the second wireless module 21b can be optimized.

Implementation 3: The data rate analyzer 12 compares the data rate between the first wireless module 11a and the second wireless module 21a of the first group with the data rates between the first wireless module 11c and the second wireless module 21c of the second or third group. If the data rate of the first group is higher, the master controller 13 will drive the slave controller 23a of the first group to decrease the transmission power of the second wireless module 21a. In the meantime, the master controller 13 drives of the slave controller 23c of the third group to increase the transmission power of the second wireless module 21c of the third group, until the data rate between the first wireless module 11a, 11b, 11c and the second wireless module 21a, 21b, 21c of each group is substantially equal. Therefore, the data transmitted by the secondary wireless apparatuses 20 at different distances can be received at the same data rate by the main wireless apparatus 10, so as to optimize the data rate.

Implementation 4: The data rate analyzer 12 sets a standard value of the data rate and compares of the data rate between the first wireless module 11a and the second wireless module 21a of the first group with the data rate between of the first wireless module 11c and the second wireless module 21c of the second or third group. If the data rate of the first group is higher, the master controller 13 will drive the slave controller 23a of the first group to decrease the transmission power of the second wireless module 21a. In the meantime, the master controller 13 drives the slave controller 23c of the third group to increase the transmission power of the second wireless module 21c of the third group until the data rate between the first wireless module 11a, 11b, 11c and the second wireless module 21a, 21b, 21c of each group is equal to the standard value. Therefore, the data transmitted by the secondary wireless apparatuses 20 at different distances can be received by the main wireless apparatus 10 stably, so that the data rate and/or transmitting distance are optimized.

In an implementation, the main wireless apparatus 10 further includes a memory module 14 and a reset key 15, wherein the memory module 14 is provided for storing an adjusting value when the master controller 13 drives each slave controller 23a, 23b, 23c to stop increasing or decreasing the transmission power of the second wireless module 21a, 21b, 21c; and the reset key 15 is provided for driving the data rate analyzer 12 to re-detect the data rate between the first wireless module 11a, 11b, 11c and the second wireless module 21a, 21b, 21c of each group. By the aforementioned method, the data rate and/or transmitting distance between the main wireless apparatus 10 and the plurality of secondary wireless apparatuses 20 are optimized.

In FIG. 1, the main wireless apparatus 10 is built in a monitoring host system 100, and a plurality of secondary wireless apparatuses 20 are built in different monitors 200 at different distances. In this embodiment, the monitoring host system 100 and the monitor 200 further include a video codec processor 101, 201, a display device 102, 202 and a network interface 103, 203 for uploading the monitoring data to the cloud, and these are prior art, and thus will not be described here.

Figure 3:
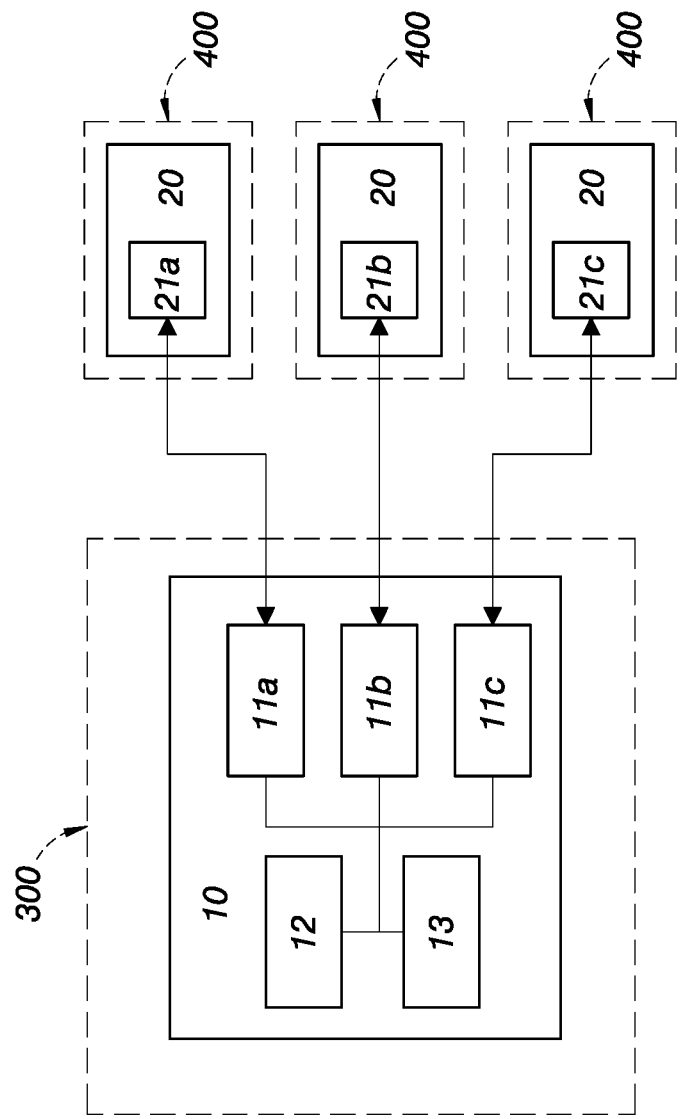
FIG. 3 is a schematic block diagram of a second embodiment of the present invention.
Figure 4:
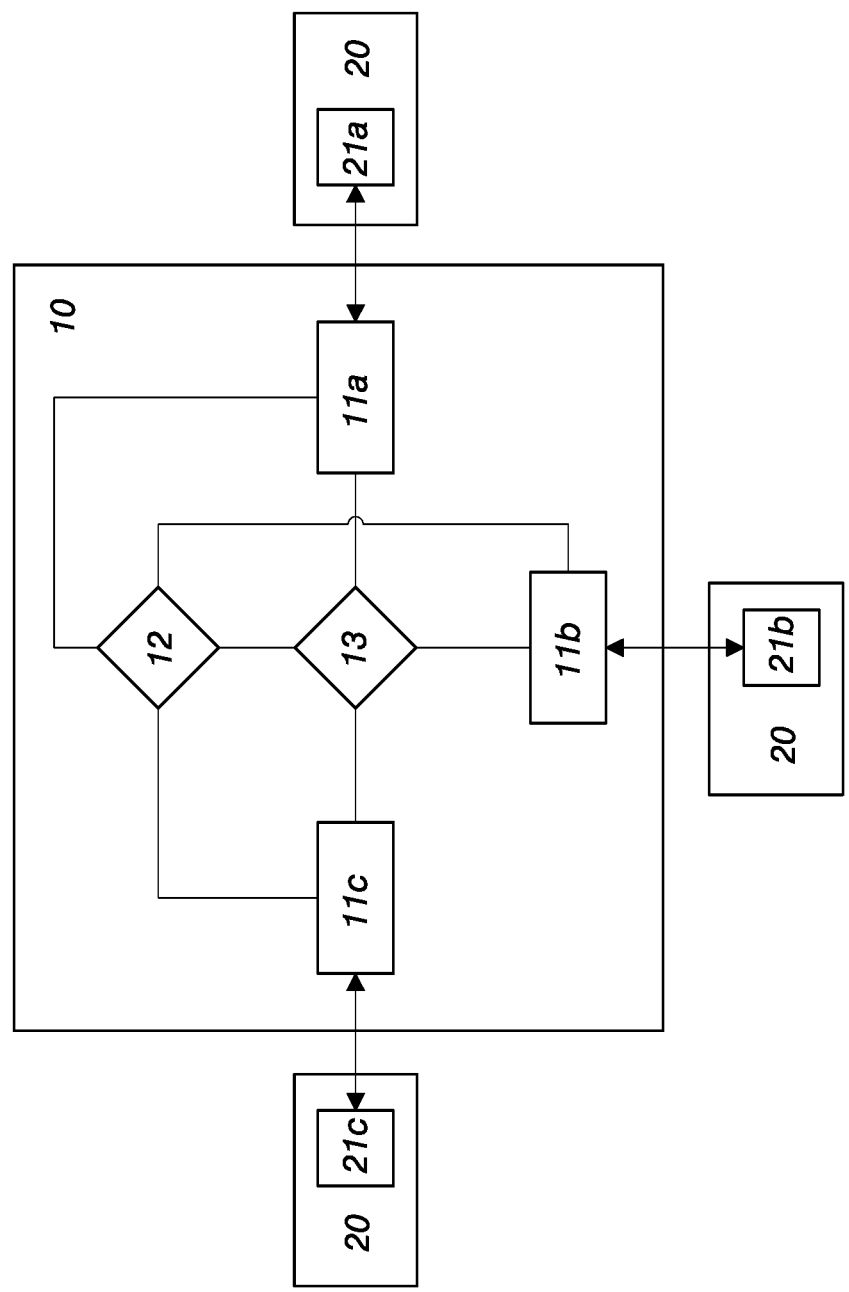
FIG. 4 is a schematic view showing the flowchart of an operation of the second embodiment of the present invention.

In FIGS. 3 and 4, the present invention may be applied to a system with a main wireless apparatus 10 transmitting data to a plurality of secondary wireless apparatuses 20. For example, the main wireless apparatus 10 is built in a monitoring apparatus 300, and the plurality of secondary wireless apparatuses 20 are built in a plurality of display apparatuses 400 or monitoring host systems (not shown in the figure) at different distances.

The difference between the system of this embodiment and the system as shown in FIG. 1 resides on that the first wireless modules 11a, 11b, 11c of the main wireless apparatus 10 are capable of transmitting video data to the second wireless modules 21a, 21b, 21c of each secondary wireless apparatus 20. In addition, the second wireless modules 21a, 21b, 21c of each secondary wireless apparatus 20 receive data passively and require no slave controller, so that the master controller 13 can adjust the transmission power of each first wireless module 11a, 11b, 11c according to the aforementioned method directly to achieve the effects of saving power and optimizing the data rate and/or transmitting distance.

While the invention has been described by means of specific embodiments, numerous modifications and variations could be made thereto by those skilled in the art without departing from the scope and spirit of the invention set forth in the claims.

What is claimed is:

1. A wireless transmission system capable of automatically adjusting transmission power, comprising a main wireless apparatus and a plurality of secondary wireless apparatuses, wherein the main wireless apparatus has a plurality of first wireless modules for receiving data, and each secondary wireless apparatus has a second wireless module for transmitting data to be received by the corresponding first wireless module, characterized in that the main wireless apparatus further comprises a data rate analyzer and a master controller, wherein the data rate analyzer is configured to detect a data rate between the first wireless module and the second wireless module of each group, and the master controller is configured to send an instruction to any one of the secondary wireless apparatuses according to the data rate of each group, and each secondary wireless apparatus comprises a slave controller configured to receive the instruction of the master controller of the main wireless apparatus and increase or decrease the transmission power of the second wireless module according to the instruction, so as to optimize the data rate, transmitting distance, or both between the main wireless apparatus and the plurality of secondary wireless apparatuses; and wherein the data rate analyzer sets a standard value of the data rate, and if the data rate between the first wireless module and the second wireless module of any group is greater than the standard value, the master controller will drive the slave controller to decrease the transmission power of the second wireless module of the group until the data rate between the first wireless module and the second wireless module of the group is equal to the standard value.

2. The wireless transmission system capable of automatically adjusting transmission power according to claim 1, wherein the main wireless apparatus is built in a monitoring host system, and each secondary wireless apparatus is built in a monitor, and the data transmitted by each second wireless module are video data.

3. The wireless transmission system capable of automatically adjusting transmission power according to claim 2, wherein the main wireless apparatus comprises a memory module and a reset key, and the memory module is provided for storing an adjusting value of which the master controller drives the slave controller of each group to increase or decrease the transmission power, and the reset key is provided for driving the data rate analyzer to re-detect the data rate between the first wireless module and the second wireless module of each group.

4. A wireless transmission system capable of automatically adjusting transmission power, comprising a main wireless apparatus and a plurality of secondary wireless apparatuses, wherein the main wireless apparatus has a plurality of first wireless modules for receiving data, and each secondary wireless apparatus has a second wireless module for transmitting data to be received by the corresponding first wireless module, characterized in that the main wireless apparatus further comprises a data rate analyzer and a master controller, wherein the data rate analyzer is configured to detect a data rate between the first wireless module and the second wireless module of each group, and the master controller is configured to send an instruction to any one of the secondary wireless apparatuses according to the data rate of each group, and each secondary wireless apparatus comprises a slave controller configured to receive the instruction of the master controller of the main wireless apparatus and increase or decrease the transmission power of the second wireless module according to the instruction, so as to optimize the data rate, transmitting distance, or both between the main wireless apparatus and the plurality of secondary wireless apparatuses; and wherein the data rate analyzer sets a standard value of the data rate, and if the data rate between the first wireless module and the second wireless module of any group is smaller than the standard value of the data rate, the master controller will drive the slave controller to increase the transmission power of the second wireless module of the group until the data rate between the first wireless module and the second wireless module of the group is equal to the standard value.

5. The wireless transmission system capable of automatically adjusting transmission power according to claim 4, wherein the main wireless apparatus is built in a monitoring host system, and each secondary wireless apparatus is built in a monitor, and the data transmitted by each second wireless module are video data.

6. The wireless transmission system capable of automatically adjusting transmission power according to claim 5, wherein the main wireless apparatus comprises a memory module and a reset key, and the memory module is provided for storing an adjusting value of which the master controller drives the slave controller of each group to increase or decrease the transmission power, and the reset key is provided for driving the data rate analyzer to re-detect the data rate between the first wireless module and the second wireless module of each group.

7. A wireless transmission system capable of automatically adjusting transmission power, comprising a main wireless apparatus and a plurality of secondary wireless apparatuses, wherein the main wireless apparatus has a plurality of first wireless modules for receiving data, and each secondary wireless apparatus has a second wireless module for transmitting data to be received by the corresponding first wireless module, characterized in that the main wireless apparatus further comprises a data rate analyzer and a master controller, wherein the data rate analyzer is configured to detect a data rate between the first wireless module and the second wireless module of each group, and the master controller is configured to send an instruction to any one of the secondary wireless apparatuses according to the data rate of each group, and each secondary wireless apparatus comprises a slave controller configured to receive the instruction of the master controller of the main wireless apparatus and increase or decrease the transmission power of the second wireless module according to the instruction, so as to optimize the data rate, transmitting distance, or both between the main wireless apparatus and the plurality of secondary wireless apparatuses; and wherein the data rate analyzer is capable of comparing the data rate between the first wireless module and the second wireless module of each group; the master controller decreases the transmission power of the second wireless module of the slave controller of a group having a higher data rate and increases the transmission power of the second wireless module of the slave controller of the group having a lower data rate until the data rate between the first wireless module and the second wireless module of each group is substantially equal.

8. The wireless transmission system capable of automatically adjusting transmission power according to claim 7, wherein the main wireless apparatus is built in a monitoring host system, and each secondary wireless apparatus is built in a monitor, and the data transmitted by each second wireless module are video data.

9. The wireless transmission system capable of automatically adjusting transmission power according to claim 8, wherein the main wireless apparatus comprises a memory module and a reset key, and the memory module is provided for storing an adjusting value of which the master controller drives the slave controller of each group to increase or decrease the transmission power, and the reset key is provided for driving the data rate analyzer to re-detect the data rate between the first wireless module and the second wireless module of each group.

10. A wireless transmission system capable of automatically adjusting transmission power, comprising a main wireless apparatus and a plurality of secondary wireless apparatuses, wherein the main wireless apparatus has a plurality of first wireless modules for receiving data, and each secondary wireless apparatus has a second wireless module for transmitting data to be received by the corresponding first wireless module, characterized in that the main wireless apparatus further comprises a data rate analyzer and a master controller, wherein the data rate analyzer is configured to detect a data rate between the first wireless module and the second wireless module of each group, and the master controller is configured to send an instruction to any one of the secondary wireless apparatuses according to the data rate of each group, and each secondary wireless apparatus comprises a slave controller configured to receive the instruction of the master controller of the main wireless apparatus and increase or decrease the transmission power of the second wireless module according to the instruction, so as to optimize the data rate, transmitting distance, or both between the main wireless apparatus and the plurality of secondary wireless apparatuses; and wherein the data rate analyzer sets a standard value of the data rate and compares the data rate between the first wireless module and the second wireless module of each group; and the master controller drives the slave controller to decrease the transmission of the second wireless module in the group with a higher data rate and to increase the transmission power of the second wireless module in the group with a lower data rate, until the data rate of the first wireless module and the second wireless module is equal to the standard value.

11. The wireless transmission system capable of automatically adjusting transmission power according to claim 10, wherein the main wireless apparatus is built in a monitoring host system, and each secondary wireless apparatus is built in a monitor, and the data transmitted by each second wireless module are video data.

12. The wireless transmission system capable of automatically adjusting transmission power according to claim 11, wherein the main wireless apparatus comprises a memory module and a reset key, and the memory module is provided for storing an adjusting value of which the master controller drives the slave controller of each group to increase or decrease the transmission power, and the reset key is provided for driving the data rate analyzer to re-detect the data rate between the first wireless module and the second wireless module of each group.

* * * * *